US009807227B2

(12) United States Patent
Ku et al.

(10) Patent No.: US 9,807,227 B2
(45) Date of Patent: Oct. 31, 2017

(54) METHOD FOR PROCESSING DATA AND ELECTRONIC DEVICE THEREOF

(71) Applicant: Samsung Electronics Co., Ltd., Gyeonggi-do (KR)

(72) Inventors: Jae-Sung Ku, Gyeonggi-do (KR); Joo-Hyun Kim, Gyeonggi-do (KR); Sun-Wook Bae, Gyeonggi-do (KR); Jong-Sang Won, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 324 days.

(21) Appl. No.: 14/601,463

(22) Filed: Jan. 21, 2015

(65) Prior Publication Data

US 2015/0207925 A1 Jul. 23, 2015

(30) Foreign Application Priority Data

Jan. 21, 2014 (KR) ........................ 10-2014-0007170

(51) Int. Cl.
*G06F 1/32* (2006.01)
*H04M 1/725* (2006.01)
(Continued)

(52) U.S. Cl.
CPC ........ *H04M 1/72583* (2013.01); *G06F 1/305* (2013.01); *G06F 1/3293* (2013.01);
(Continued)

(58) Field of Classification Search
CPC .. G06F 1/3296; G06F 11/3604; G06F 1/3203; G06F 1/3206; H04W 52/0264; H04W 52/0267
See application file for complete search history.

(56) References Cited

U.S. PATENT DOCUMENTS 7,916,676 B2 * 3/2011 Elzur ...................... H04L 12/12
370/311
8,700,931 B2 * 4/2014 Gudlavenkatasiva G06F 1/3212
455/344
(Continued)

FOREIGN PATENT DOCUMENTS

CN 103034397 A 4/2013

OTHER PUBLICATIONS

Microsoft Windows 98 Keyboard Guide, Mar. 27, 2001, Microsoft Windows 98 Keyboard Guide, Jul. 7, 1998, XP055184884, http://atto.buffalo.edu/registered/ATBasics/AdaptingComputers/SimpleModifications/w98_kbd.pdf, pp. 1-13.
(Continued)

*Primary Examiner* — Ryan Pitaro
(74) *Attorney, Agent, or Firm* — Cha & Reiter, LLC.

(57) ABSTRACT

An electronic device and method for entering an inactive mode, the electronic device including a display; and one or more processors. The processors may implement the method, which includes detecting an input to the electronic device indicating deactivation of a display of the electronic device or entrance into an inactive mode, detecting whether one or more objects executing one the one or more processors force the one or more processors to remain in an active mode, and when the one or more objects are detected, retrieving information on the one or more objects and display on the display the retrieved information.

14 Claims, 13 Drawing Sheets

(51) Int. Cl.
  *G06F 3/0488* (2013.01)
  *H04M 1/73* (2006.01)
  *G06F 9/44* (2006.01)
  *G06F 1/30* (2006.01)
  *H04W 52/02* (2009.01)

(52) U.S. Cl.
  CPC ............ *G06F 3/0488* (2013.01); *G06F 9/44* (2013.01); *H04M 1/73* (2013.01); *H04W 52/0264* (2013.01); *H04W 52/0267* (2013.01); *Y02B 60/121* (2013.01); *Y02B 60/32* (2013.01)

(56) References Cited

U.S. PATENT DOCUMENTS

| | | | | |
|---|---|---|---|---|
| 8,850,251 | B1* | 9/2014 | Maeng | G06F 1/3206 713/300 |
| 8,904,220 | B2* | 12/2014 | Saba | G06F 1/3203 713/300 |
| 9,229,522 | B1* | 1/2016 | Tian | G06F 9/4418 |
| 2007/0050769 | A1* | 3/2007 | Switzer | G06F 9/485 718/100 |
| 2007/0280645 | A1 | 12/2007 | Morohoshi et al. | |
| 2009/0083560 | A1* | 3/2009 | O'Connell | G06F 1/3209 713/323 |
| 2009/0259865 | A1* | 10/2009 | Sheynblat | G06F 1/3203 713/323 |
| 2010/0029303 | A1* | 2/2010 | Lim | H04L 12/1859 455/466 |
| 2010/0064154 | A1* | 3/2010 | King | H04W 52/0251 713/320 |
| 2010/0102971 | A1 | 4/2010 | Virtanen et al. | |
| 2011/0040990 | A1* | 2/2011 | Chan | G06F 1/28 713/300 |
| 2011/0040996 | A1* | 2/2011 | Hackborn | G06F 11/3409 713/340 |
| 2011/0246056 | A1 | 10/2011 | de Silva et al. | |
| 2011/0296416 | A1* | 12/2011 | Kim | G06F 11/328 718/100 |
| 2012/0011511 | A1* | 1/2012 | Horvitz | G06F 9/461 718/100 |
| 2012/0102191 | A1* | 4/2012 | Rabii | G06F 9/5011 709/224 |
| 2013/0024706 | A1* | 1/2013 | Katar | H04L 12/12 713/321 |
| 2013/0041790 | A1* | 2/2013 | Murugesan | G06F 9/4856 705/30 |
| 2013/0059531 | A1* | 3/2013 | Kim | H04L 65/1083 455/39 |
| 2013/0339770 | A1* | 12/2013 | Tu | G06F 1/32 713/320 |
| 2014/0017996 | A1* | 1/2014 | Hamilton | H04W 4/008 455/41.1 |
| 2014/0198331 | A1* | 7/2014 | Bin | G06F 9/4418 358/1.13 |
| 2014/0240138 | A1* | 8/2014 | Lee | H04M 1/7253 340/636.1 |
| 2014/0344764 | A1* | 11/2014 | Brewer | G06F 3/017 715/863 |
| 2015/0032889 | A1* | 1/2015 | Chan | H04L 67/1095 709/224 |
| 2015/0103708 | A1* | 4/2015 | Kang | H04W 76/023 370/311 |
| 2015/0153810 | A1* | 6/2015 | Sasidharan | G06F 1/3212 713/320 |
| 2015/0198998 | A1* | 7/2015 | Nanda | G06F 1/3234 713/323 |
| 2015/0295613 | A1* | 10/2015 | Kim | H04B 1/3838 455/550.1 |
| 2016/0026381 | A1* | 1/2016 | Kim | G06F 3/04817 715/761 |
| 2016/0088566 | A1* | 3/2016 | Ur | H04W 52/0251 455/574 |
| 2016/0212208 | A1* | 7/2016 | Kulkarni | G06F 9/5072 |
| 2016/0252944 | A1* | 9/2016 | Kim | G06F 1/28 713/340 |
| 2016/0253187 | A1* | 9/2016 | Kim | G06F 9/44505 719/320 |

OTHER PUBLICATIONS

Advanced Task Manager Tutorial, Apr. 12, 2010, pp. 1-10 http://www.infolife.mobi/help/taskmanager/tutorial.html.
European Search Report dated Apr. 11, 2016.
European Search Report, Dated: Dec. 23, 2016.

\* cited by examiner

METHOD FOR PROCESSING DATA AND ELECTRONIC DEVICE THEREOF

CROSS-REFERENCE TO RELATED APPLICATION

This application claims priority under 35 U.S.C. §119 to an application filed in the Korean Intellectual Property Office on Jan. 21, 2014 and assigned Serial No. "10-2014-0007170", the entire contents of which are incorporated herein reference.

TECHNICAL FIELD

Various example embodiments relate to a method for controlling data processing in an electronic device and the electronic device thereof.

BACKGROUND

With the growth of mobile communication technologies, there is a proliferation of electronic devices in diversity of smart phones, wearable devices, tablet Personal Computers (PCs) and the like, each of which can transmit/receive diverse data through communication networks. The electronic devices can provide various functions such as telephone functions, message functions, and alarm functions. Further, in carrying out the various functions, the electronic devices can also perform multiple functions simultaneously.

The electronic devices can provide multitasking of functions in the electronic devices to users, and can control operation states of the events provided by the electronic devices.

SUMMARY

With the advancement of a function of a processor of an electronic device, the electronic device became able to activate a plurality of functions at one time. This resulted in an increase of a battery consumption amount of the electronic device. On the other hand, the electronic device has a limited battery capacity, so there is an inconvenience that the electronic device causes quick battery consumption because performing several functions at one time.

Various example embodiments provide a method and apparatus for notifying a user of information about one or more objects being operating, thereby being able to control operation states of the objects and further manage a battery use in an electronic device. In one aspect of this disclosure, an operation method of an electronic device is disclosed, including detecting, by a processor, an input to the electronic device indicating deactivation of a display of the electronic device or entrance into an inactive mode, detecting whether one or more objects executing on the processor force the processor to remain in an active mode, and if the one or more objects are detected, retrieving information on the one or more objects and displaying on the display the retrieved information.

In another aspect of this disclosure, an operation method of an electronic device is disclosed, including: detecting, by a processor, an input to the electronic device indicating deactivation of a display of the electronic device or entrance into an inactive mode, deactivating the display in response to the input, and detecting whether one or more objects executing on a processor of the electronic device force the processor to remain in an active mode, and retrieving information on the one or more objects, and reactivating the display and displaying the retrieved information on the display.

In another aspect of this disclosure, an electronic device is disclosed including a display; and one or more processors, configured to: detect an input to the electronic device indicating deactivation of a display of the electronic device or entrance into an inactive mode, detect whether one or more objects executing one the one or more processors force the one or more processors to remain in an active mode, and when the one or more objects are detected, retrieve information on the one or more objects and display on the display the retrieved information.

BRIEF DESCRIPTION OF THE DRAWINGS

The present disclosure will become more apparent from the following detailed description when taken in conjunction with the accompanying drawings in which.

DETAILED DESCRIPTION

Figure 1:
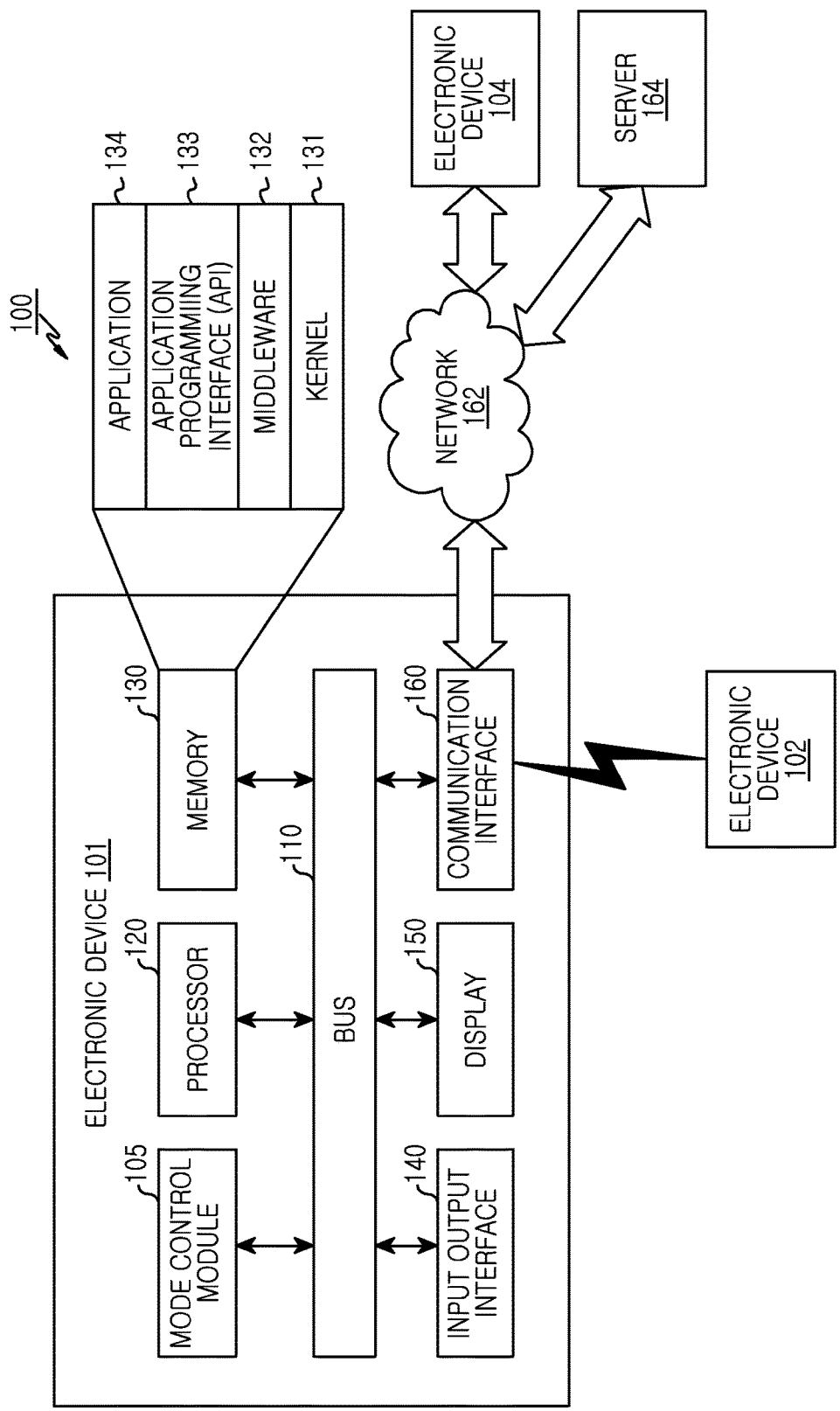
FIG. 1 is a block diagram illustrating a construction of an electronic device according to various example embodiments.

According to various example embodiments below, an electronic device may sense entry into an inactive state, and may acquire a list of one or more objects keeping one or more processors of the electronic device in an active state, and may output information about the acquired objects.

According to various example embodiments, the electronic device may acquire information about one or more objects keeping one or more processors of the electronic device in an active state during turn-off of a display module, and the electronic device may sense an operation of turning on the display module and may output the acquired information about the objects.

The present disclosure is described below with reference to the accompanying drawings. Although the present disclosure illustrates specific example embodiments in the drawings and states a related detailed description, the present disclosure may make various modifications and provide several example embodiments. Accordingly, it should be understood that the present disclosure does not intend to limit a specific embodiment form, and includes all modifications or equivalents or substitutes included in the spirit and technological scope of the present disclosure. In relation to a description of the drawing, like constituent elements are denoted by like reference symbols. For the purposes of clarity and simplicity, a detailed description of well-known functions or constructions making unclear the gist of the present disclosure will be omitted. In the following description, it should be noted that parts useful for understanding an operation according to various example embodiments of the present disclosure will be described, and a description of other parts will be omitted in order to make the gist of the present disclosure clear.

The expressions "comprise", "may comprise" and the like usable in the present disclosure indicate the existence of invented corresponding functions, operations, constituent elements and the like, and do not limit additional one or more functions, operations, constituent elements and the like. Also, in the present disclosure, it should be understood that the terms "comprise", "have", etc. are to designate the existence of features stated in the specification, numerals, steps, operations, constituent elements, parts, or a combination of them, and are not to previously exclude the possibility of existence or addition of one or more other features, numerals, steps, operations, constituent elements, parts, or a combination of them.

An electronic device according to the present disclosure may be a device including a communication function. For example, the electronic device may include a smart phone, a tablet Personal Computer (PC), a mobile phone, a video phone, an electronic book reader, a desktop PC, a laptop PC, a netbook computer, a Personal Digital Assistant (PDA), a Portable Media Player (PMP), an MPEG Audio Layer 3 (MP3) player, a mobile medical instrument, a camera, and a wearable device (e.g., at least one of a Head Mounted Display (HMD) such as electronic glasses, electronic clothes, an electronic bracelet, an electronic necklace, an electronic appccessory, or a smart watch).

According to some example embodiments, the electronic device may be smart electronic home appliances having a communication function. The smart electronic home appliances may include, for example, at least one of a television, a Digital Versatile Disc (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, or an electronic frame.

According to some example embodiments, the electronic device may include at least one of various medical instruments (e.g., Magnetic Resonance Angiography (MRA), Magnetic Resonance Imaging (MRI), Computerized Tomography (CT), a moving-camera, an ultrasound machine and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass and the like), avionics, or a security instrument.

According to some example embodiments, the electronic device may include at least one of a part of furniture or building/structure including a communication function, an electronic board, an electronic signature input device, a projector, or various metering instruments (e.g., tap water, electricity, gas or radio wave or the like). The electronic device according to the present disclosure may be one of the aforementioned various devices or a combination of two or more. Also, it is obvious to those skilled in the art that the electronic device according to the present disclosure is not limited to the aforementioned instruments. Below, an electronic device according to various example embodiments of the present disclosure will be described with reference to the accompanying drawings. The term 'user' used in various example embodiments of the present disclosure may include and denote a person who uses the electronic device or a device (e.g., an artificial intelligent electronic device) which uses the electronic device.

FIG. 1 is a block diagram 100 illustrating a construction of an electronic device 101 according to various example embodiments.

Referring to FIG. 1, the electronic device 101 may include a mode control module 105, a bus 110, a processor 120, a memory 130, an input/output interface 140, a display 150, and a communication interface 160.

The mode control module 105 may acquire information about an object operating in the electronic device 101. According to one example embodiment, the mode control module 105 may acquire information about one or more objects operating in a "turn-off" state of the display 150. At a time point when a state of the display 150 is turned off or on, the mode control module 105 may output the acquired information about the one or more objects. Even during the turn-off of the display 150, the mode control module 105 may output the information about the one or more objects being operating during the turn-off state of the display 150, periodically dependent on the lapse of a designated time. Here, the aforementioned object may be of a form of a software module such as a program operating in the electronic device 101 but, without being limited to this, the aforementioned object may also include a meaning of data processed in the object or a function carried out in the electronic device 101.

A description may be made in which various example embodiments of the present disclosure are carried out by the mode control module 105, but the various example embodiments may be an operation carried out by the control of the processor 120. Further, the mode control module 105 may be a module separate from the processor 120 and programmed to control the various example embodiments of the present disclosure. The mode control module 105 programmed to control the various example embodiments of the present disclosure may be also operated by the control of the processor 120.

The bus 110 may be a circuit coupling the aforementioned constituent elements with one another and forwarding communication (e.g., a control message) between the aforementioned constituent elements.

The processor 120 may, for example, receive instructions from the aforementioned other constituent elements (e.g., the memory 130, the input/output interface 140, the display 150, the communication interface 160, and the like) through the bus 110, and decipher the received instructions, and execute operation or data processing according to the deciphered instructions.

The memory 130 may store an instruction or data received from the processor 120 or the other constituent elements (e.g., the input/output interface 140, the display 150, the communication interface 160, and the like) or is generated by the processor 120 or the other constituent elements. The memory 130 may, for example, include programming modules such as a kernel 131, a middleware 132, an Application Programming Interface (API) 133, an application 134 or the like. The aforementioned programming modules each may be implemented in software, firmware, hardware or a combination of at least two or more of them.

The kernel 131 may control or manage system resources (e.g., the bus 110, the processor 120, the memory 130 or the like) used for executing operations implemented by other programming modules, for example, the middleware 132, the API 133, or the application 134. Also, the kernel 131 may provide an interface enabling the middleware 132, the API 133, or the application 134 to connect and control or manage the individual constituent element of the electronic device 101.

The middleware 132 may perform a relay role enabling the API 133 or the application 134 to communicate and exchange data with the kernel 131. Also, in relation to work requests received from the (plurality of) applications 134, the middleware 132 may, for example, perform load balancing for the work requests using a method of allocating at least one application among the (plurality of) applications 134 the order of priority capable of using the system resources (e.g., the bus 110, the processor 120, the memory 130 or the like) of the electronic device 101.

The API 133 is an interface enabling the application 134 to control a function provided by the kernel 131 or the middleware 132. The API 133 may, for example, include at least one interface or function for file control, window control, picture processing, character control or the like.

The input/output interface 140 may, for example, receive an input of an instruction or data from a user and forward the instruction or data to the processor 120 or the memory 130 through the bus 110. The display 150 may display a picture, a video, data or the like to the user.

The communication interface 160 may establish communication between the electronic device 101 and other electronic device 102 or electronic device 104 or server 164. The communication interface 160 may support a certain short-range communication protocol (e.g., Wireless Fidelity (WiFi), Bluetooth (BT), or Near Field Communication (NFC)) or a certain network communication 162 (e.g., the Internet, a Local Area Network (LAN), a Wide Area Network (WAN), a telecommunication network, a cellular network, a satellite network, a Plain Old Telephone System (POTS) or the like). The electronic devices 102 and 104 each may be the same (e.g., same type) device as the electronic device 101 or may be a different (e.g., different type) device.

Various states of an electronic device are described below. An "active state" may denote a state in which the display 150 of the electronic device 101 is activated, that is, a state in which one or more processors 120 of the electronic device 101 uses a designated electric current capacity or designated average electric energy or more per unit hour, and a state in which the processor 120 is processing data (e.g., a state in which a data processing amount is equal to or is greater than a designated numerical value).

An "inactive state" may denote a state in which the display 150 of the electronic device 101 is deactivated, a state maintaining a state in which an electric current capacity or average electric energy per unit hour consumed by one or more processors 120 of the electronic device 101 is equal to or less than a designated electric current capacity or designated average electric energy, and/or a state in which a data processing amount of the processor 120 is less than a designated numerical value. The inactive state may be also expressed as a "maximum power saving mode."

Further, a "waiting state" may be defined for the sake of clear description below. The waiting state may denote a state in which the display 150 of the electronic device 101 is deactivated but fails to meet a condition of the inactive state (e.g., the state in which the electric current capacity or average electric energy per unit hour consumed by one or more processors 120 of the electronic device 101 is equal to or is less than the designated electric current capacity or designated average electric energy, and/or the state in which the data processing amount of the processor 120 is less than the designated numerical value). The waiting state may also be expressed as a "power saving mode."

According to one example embodiment, in the active state of the electronic device 101, the electronic device 101 may turn off the display 150 in accordance to a user's gesture inputted to the electronic device 101, and the electronic device 101 may enter the waiting state or the inactive state. As described above, the active state, the inactive state, and the waiting state may be characterized by the electric current capacity or average electric energy per unit hour consumed in the processor 120. But, this does not limit the ambit of the disclosure, and alternatives are possible, such as where the waiting state or the inactive state may be described using an electric current capacity or average electric energy per unit hour consumed by a designated module of the electronic device 101.

Figure 2:
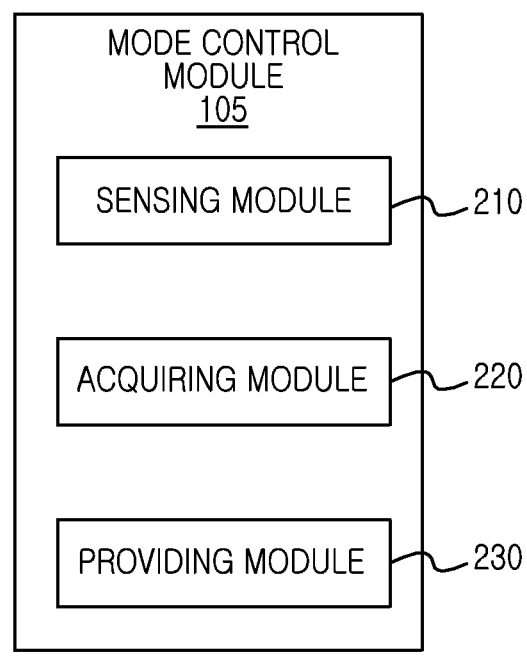
FIG. 2 illustrates a mode control module of an electronic device according to various example embodiments.

FIG. 2 illustrates a mode control module 105 of an electronic device according to various example embodiments.

Referring to FIG. 2, the mode control module 105 may include one or more modules among a sensing module 210, an acquiring module 220, and a providing module 230.

Various example embodiments of each module are described below.

The sensing module 210 may sense one or more operations generated in the electronic device 101. According to one example embodiment, the sensing module 210 may sense an input of an instruction of controlling the electronic device 101 to operate in a power saving mode or inactive state in an active state of the electronic device 101. According to another example embodiment, the sensing module 210 may sense an input of an instruction for controlling the electronic device 101 to release the inactive state of the electronic device 101. According to one example embodiment, the instruction to execute the inactive state or the instruction to release the inactive state may utilize one or more of a method of receiving activation of, for example, a power button of the electronic device 101, receiving a designated operation through an input device, receiving designated gesture to a touch screen, and receiving a designated motion, the variations thus detected by the electronic device 101.

The acquiring module 220 may acquire information about one or more operations of the electronic device 101 carried out through one or more processors 120 of the electronic device 101. According to one example embodiment, in a process of enabling the electronic device 101 to enter an inactive state when receiving input of an instruction indicating execution of the inactive state, the acquiring module 220 may acquire information about an object requesting deferral of placing at least one or more processors of the electronic device 101 into the inactive state, or requesting continued processing of data through the at least one or more processors of the electronic device 101. According to one example embodiment, the input of the indicating execution of the inactive state is received, the acquiring module 220 may confirm an object deferring entry of the at least one or more processors of the electronic device 101 into the inactive state. According to another example embodiment, the acquiring module 220 may acquire information about one or more objects allowing operation of the at least one or more processors of the electronic device 101 in an active state, even as the electronic device 101 operates within the inactive state.

Here, the object processed in the active state of the electronic device 101 (e.g., the object hindering the at least one or more processors of the electronic device 101 from entering the inactive state or the object converting the at least one or more processors of the electronic device 101 into the active state in the electronic device 101 of the inactive state) may be an application included in the electronic device, a function set to the application, an operation carried out based on the application, or data including the aforementioned information. According to one example embodiment, the object may be setting information (or time count information) about an alarm (e.g., a work such as a schedule alarm and a time alarm) set to output a designated effect at a designated time in the electronic device 101, a function (e.g., a work such as system synchronization, address book synchronization, coupled-network state measurement, network communication signal update, and location information transmission to a designated server) set to be carried out every designated period, and a function (e.g., a work such as contents reservation transmission, contents reservation reception, and a designated timer setting function) set to be carried out at a designated time, and/or an application (e.g., an image editing application of when the image editing application is not closed after image editing) processed by the processor 210 of the electronic device 101 and resident in a Random Access Memory (RAM) (not shown) of the electronic device 101. The aforementioned information about the object may be decided to be information such as a frequency of use of the object in the electronic device 101, a position in which the aforementioned object is stored, a time during which the aforementioned object is operating, a time at which operation is executed when the aforementioned object is a reserved work or alarm, a corresponding image, text, or sound when the aforementioned object is displayed on a display, a designated period when the aforementioned object operates every designated period, and a processor 120 processing occupation rate of the aforementioned object. The aforementioned information about the object may be implemented within data of an Application Programming Interface (API) form or data about API information. In outputting the aforementioned information about the object, the acquiring module 220 may output the aforementioned information about the object, as data or identification information of a designated sound, icon, text or image form that may represent (indicate) corresponding API information or an application using the corresponding API information. If there is no special mention in the following description, the 'object' may include a meaning of the 'information about the object' or the 'information of the object'.

The providing module 230 may output the information about the object hindering at least one or more processors of the electronic device 101 from entering the inactive state, acquired through the acquiring module 220. According to one example embodiment, if receiving an input of an instruction of controlling the electronic device 101 to enter the inactive state, at a time point when the display 150 turns off, the providing module 230 may output information (e.g., an icon representing a corresponding API, and an application using a text or API) about one or more APIs hindering the one or more processors of the electronic device 101 from entering the inactive state, acquired through the acquiring module 220. If the electronic device 101 displays the outputted information about the object and a designated time lapses, the providing module 230 may turn off the display 150. According to another example embodiment, while periodically turning on/off the display 150, the providing module 230 may output the information about the object hindering the one or more processors of the electronic device 101 from entering the inactive state or the information about the one or more APIs hindering the one or more processors of the electronic device 101 from entering the inactive state. According to further example embodiment, at a time point of turning on the display 150, the providing module 230 may output application information making use of one or more objects converting the one or more processors of the electronic device 101 into the active state in the electronic device 101 of the inactive state.

The aforementioned operation of the mode control module 105 may be carried out by the processor 120, or may be also carried out by the mode control module 105 constructed separately from the processor 120 and controlled by the processor 120. If there is no special mention below, it may be described that the processor 120 performs the operation of the mode control module 105.

Figure 3A:
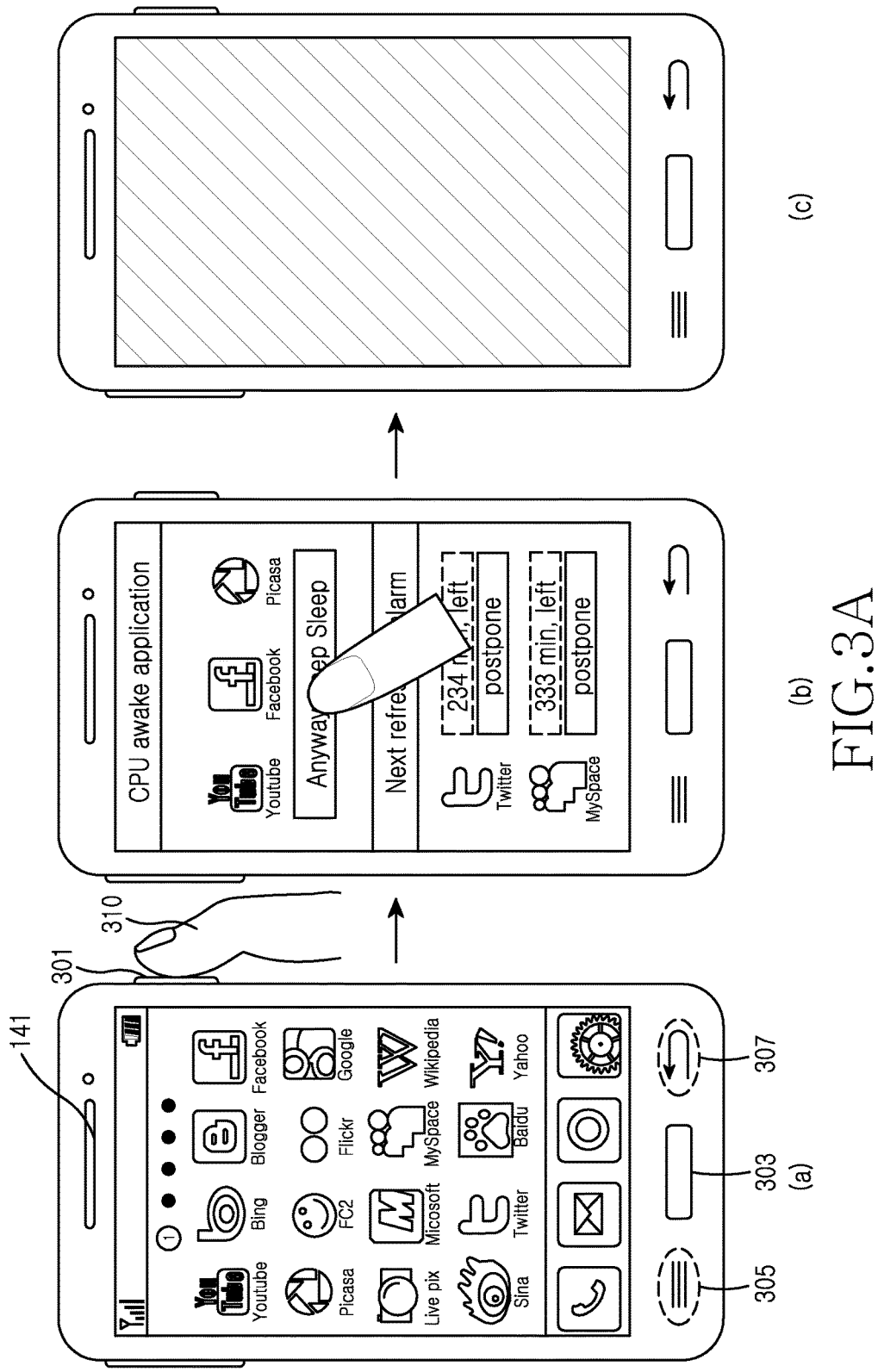
FIG. 3A and FIG. 3B illustrate an operation of providing mode information in an electronic device according to various example embodiments.
Figure 3B:
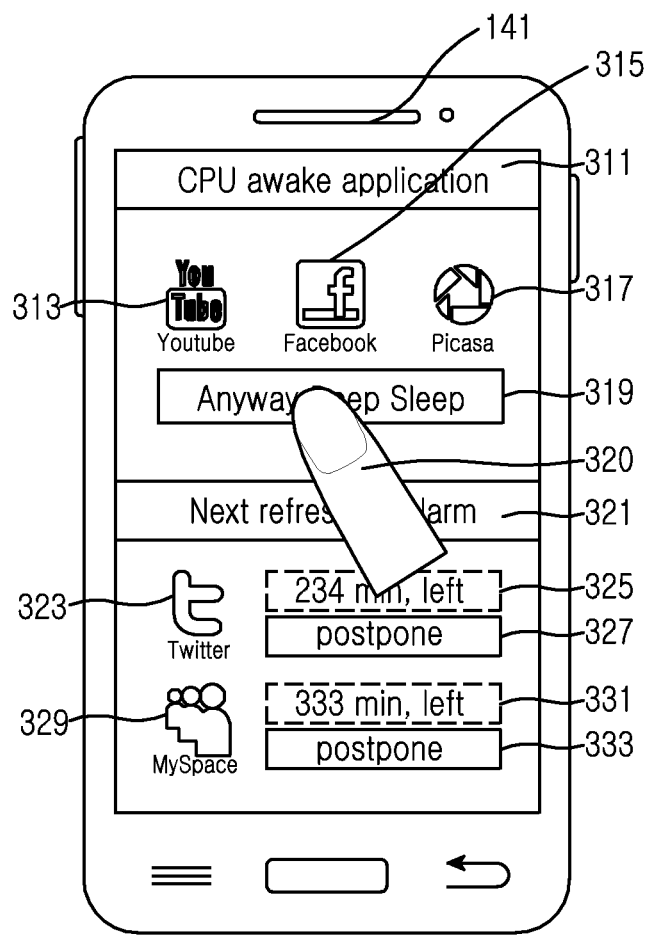

FIG. 3A and FIG. 3B illustrate an operation of providing mode information in an electronic device according to various example embodiments.

Referring to FIG. 3A and FIG. 3B, the electronic device 101 may include a speaker 141 capable of outputting a sound. The electronic device 101 may include a button 301 or 303 that is one of input devices capable of inputting an instruction when depressed by a user, disposed at, for example, a side surface (e.g., a top side surface or a bottom side surface), a front surface or a rear surface of the electronic device 101. The electronic device 101 may further include a touch button 305 or 307 capable of inputting an instruction through a touch input, disposed at a fixed position of the electronic device 101. The electronic device 101 may include at least one microphone capable of, though not illustrated, inputting an external sound in a position exposed to the outside of the electronic device 101. The electronic device 101 may include the display 150 in a front part, and may display a User Interface (UI) operation of the electronic device 101 through the display 150.

Though not illustrated, the electronic device 101 may be configured to have the speaker 141, the button 301 or 303, or the touch button 305 or 307 disposed at the same position, adjacent positions or entirely different disparate positions.

Various example embodiments of the present disclosure are described below with reference to FIG. 3A.

When an input is received designated entry into an inactive state, the electronic device 101 may display information for an API controlling maintenance of an active state of the electronic device 101, or information (e.g., identification information) on one or more objects within the API that may be toggled to maintain the active state of the electronic device 101, and after the relevant inputs are entered, may finally turn off the display 150 of the electronic device 101.

Referring to FIG. 3A (a), the electronic device 101 may detect an instruction indicating disabling the display 150 (e.g., a user operation depressing the power button 301). When this instruction is detected, the electronic device 101 may attempt to deactivate one or more processors 120 of the electronic device 101. To deactivate the one or more processors 120, the electronic device 101 may need to close one or more objects (e.g., data processed in an API form) being processed through the one or more processors 120.

When closing the one or more objects processed by the one or more processors 120, the electronic device 101 may detect that one or more of the objects, instead of being closed, continues to function, which inadvertently causes continued maintenance of the active state of the one or more processors 120. To address this issue, the electronic device 101 may detect information about the object(s) causing continued maintenance of the active state of the one or more processors 120 and/or hindering the one or more processors 120 from entering the inactive state. The information may include an operation(s) performed in the electronic device 101, applications included in the electronic device 101, and/or operation(s) performed through the application included in the electronic device 101.

When acquiring the information about the object causing maintenance of the active states of the one or more processors 120 of the electronic device 101 or hindering the one or more processors 120 from entering the inactive state, the electronic device 101 may close the one or more objects. Closing the one or more objects may be controlled by set designations to or configuration information, which may in some embodiments be inputted before the deactivation off the display 150. The electronic device 101 may acquire information about an object, that, instead of being closed, continues to be processed by the processor 120 even after other objects designated by the setting information are closed, or information about an object that is closed, and then later re-executed within a designated time.

Based on the acquired information, the electronic device 101 may identity the particular data that is being processed by the processor 120 of the electronic device 101 which hinders the processor 120 from entering the inactive state. Alternatively, the electronic device 101 may identify data consuming a designated quantity of electric energy (or more) among all the data that being processed by the processor 120, as the object hindering the processor 120 from entering the inactive state. Alternatively, based on the acquired information, the electronic device 101 may identify data consuming a threshold processor 120 usage rate (or more) relative to a designated usage rate among all data being processed by the processor 120 of the electronic device 101, as the object hindering the processor 120 of the electronic device 101 from entering the inactive state.

The aforementioned information about the object hindering the processor 120 from entering the inactive state may be applied identically or similarly to other objects operating to maintain the active state of the electronic device 101, and may be used likewise as in the foregoing description. Through configuration setting or options, the electronic device 101 may also identify partial or whole portions data as exceptions, thus never identifying the excepted objects as those that hinder the processor 120 from entering the inactive state.

The electronic device 101 may generate a processing list (e.g., a work management list of the electronic device 101) of data or applications being processed by the processor 120, and may store the processing list in a designated position of the memory 130 of the electronic device 101. When an instruction activating the electronic device 101 is detected, the electronic device 101 may identify the detected instruction as an object hindering execution of the inactive state based on processing information. According to one example embodiment, the electronic device 101 may include in the processing list information such as the battery consumption of the electronic device 101, specification information on power consumed by each application, and the corresponding data or application processed by the processor 120. The electronic device 101 may update the processing list in real time, or may update at designated periods of time.

Referring to FIG. 3A (b), the electronic device 101 may output to the display 150 of the electronic device 101 acquired information regarding at least one or more of the objects maintaining the active state of the electronic device 101 or hindering entry into the inactive state. According to one example embodiment, the electronic device 101 may detect inputs to the displayed information, and execute an operation corresponding to the detected input.

Referring to FIG. 3A (c), the electronic device 101 may turn off the display 150, after outputting the acquired information about the at least one or more objects maintain the active state of the electronic device 101 hindering the at least one or more processors 120 from entering the inactive state. According to one example embodiment, if the electronic device 101 detects no input to the outputted information and a designated time lapses, the electronic device 101 deactivate the display 150 in accordance with a display deactivation configuration or instruction. According to another example embodiment, if one or more inputs to the outputted information is detected, the electronic device 101 deactivate the display 150 after execution an operation corresponding to the detected input.

Various example embodiments of the present disclosure are described below with reference to FIG. 3B.

Referring to FIG. 3B, the electronic device 101 may acquire information about one or more executing objects causing one or more processors 120 of the electronic device 101 to remain in an active state or hindering the one or more processors 120 from entering an inactive state, and may output the acquired information to the display 150.

According to one example embodiment, if an object causing maintenance of active states of one or more processors 120 includes data associated with an application, the electronic device 101 may output information about the corresponding application, displaying as depicted, for example, a 'YouTube' application 313 information, 'Facebook' application 315 information, or 'Picasa' application 317 information. These may be displayed at a region of the display 150 (e.g., the menu region labeled "CPU Awake Application" 311).

The electronic device 101 may receive inputs on the displayed information on the outputting region 311. According to one example embodiment, the electronic device 101 may receive an input to the outputted information. For example, an input may be detected on the 'YouTube' application 313 information, such as a press-and-hold operation spanning a threshold designated time or longer, whereupon in response to the press-and-hold, the electronic device 101 terminates the operation of the one or more objects hindering execution of the inactive states of the one or more processors 120.

According to another example embodiment, the electronic device 101 may provide a menu (e.g., an 'Anyway Deep Sleep' icon 319 of FIG. 3B) for closing all or some of the one or more objects hindering the inactive states of the one or more processors 120. When the 'Anyway Deep Sleep' icon 319 is selected by an input, the electronic device 101 may terminate operation of one or more designated objects which hinder the operation of the inactive state, and the electronic device 101 may thusly enter the inactive state.

According to various example embodiments, if an object including an instruction or operation executed in a background system, such as synchronizing a portion or entirety of data within the electronic device 101 with a portion or entirety of data of another electronic device (e.g., an electronic device 102, an electronic device 104, or a server 164), the electronic device 101 may output information about a corresponding operation.

For example, the electronic device 101 may output 'Twitter' application 323 information and synchronization time 325 information executable by the one or more processors 120 to a region (e.g., a Next refreshing alarm 321) of the display 150. This region may display objects causing the one or more processors 210 to operate in an active state. The electronic device 101 may further include and display a menu (e.g., a 'postpone' icon 327) postponing a synchronization operation of the 'Twitter' application 323 information without synchronizing at a synchronization time.

In a similar method, the electronic device 101 may display 'MySpace' application 329 information and synchronization time 331 information activating the one or more processors 120 to the region (e.g., the Next refreshing alarm 321) of the display 150 outputting information about the object causing the processor 120 to maintain in the active state. The electronic device 101 may further include and display a menu (e.g., a 'postpone' icon 333) postponing a synchronization operation, allowing synchronization to lapse at a designated synchronization time.

The electronic device 101 may display one or more operations which are scheduled for execution at a designated time point. According to one example embodiment, the electronic device 101 may allow selection of one or more of the displayed objects, for example, the menu (e.g., the 'postpone' icon 327), selection of which postpones the synchronization operation of the 'Twitter' application 323.

Figure 4:
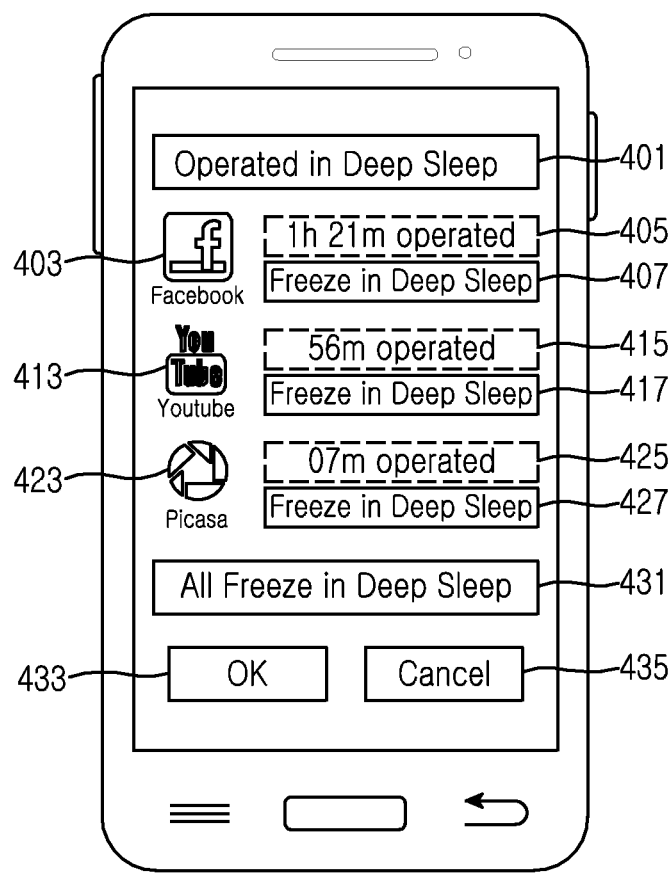
FIG. 4 illustrates an operation of providing information in accordance to mode change in an electronic device according to various example embodiments.

FIG. 4 illustrates an operation of providing information in accordance to mode change in an electronic device according to various example embodiments.

Referring to FIG. 4, the electronic device 101 may acquire information about one or more objects operated during deactivation of the display 150. When reactivating the display 150, the electronic device 101 may display (e.g., on an 'Operated in deep Sleep' region 401 of FIG. 4) the acquired information on the display 150.

According to one example embodiment, the electronic device 101 may acquire information about one or more objects causing one or more processors 120 set to have an inactive state to maintain an active state and, when reactivating the display 150, the electronic device 101 may display the acquired information. The acquired information may include, for example, objects having operated in a deactivated state of the display 150 of the electronic device 101, such as a 'Facebook' application 403, a 'YouTube' application 413 or a 'Picasa application 423. The electronic device 101 may further acquire information indicating times at which the objects operated, together with other information about the objects.

The electronic device 101 may also further include a menu of controlling one or more objects having operated during turn-off of the display 150. According to one example embodiment, when displaying information about the 'Facebook' application 403, which operated during deactivation of the display 150, the electronic device 101 may further display information 405 about a period of time (e.g., one hour and twenty one minutes) for which all or some functions of the 'Facebook' application 403 operated and/or a menu option (e.g., a 'Freeze in Deep Sleep' icon 407 of FIG. 4) for controlling or otherwise setting all or some functions of the 'Facebook' application 403, disabling them during the deactivation of the display 150.

According to one example embodiment when turning on the display 150 of the electronic device 101, the electronic device 101 may display information one or more objects causing the one or more processors 120 to operate in an active state, the information acquired at a when turning off the display 150. When each of 'Freeze in deep Sleep' menus (e.g., 407, 417, and 427) is selected, the electronic device 101 may set the corresponding application to be deactivated when the display 150 of the electronic device 101 is turned off again. According to various example embodiments, the electronic device 101 may further provide an 'All freeze in deep Sleep' menu selection 431. It may be displayed when activating the display 150 and may deactivate at least one or more objects that cause processors 120 to operate in an active state, when the display 150 of the electronic device 101 is next deactivated. When an 'OK' menu icon 433 is selected, the electronic device 101 may store the selection in memory 130 and apply the operation for all selected options during the next deactivation of the display 150. When a 'Cancel' menu 435 is selected, the electronic device 101 may cancel the configuration setting for the one or more objects.

Figure 5:
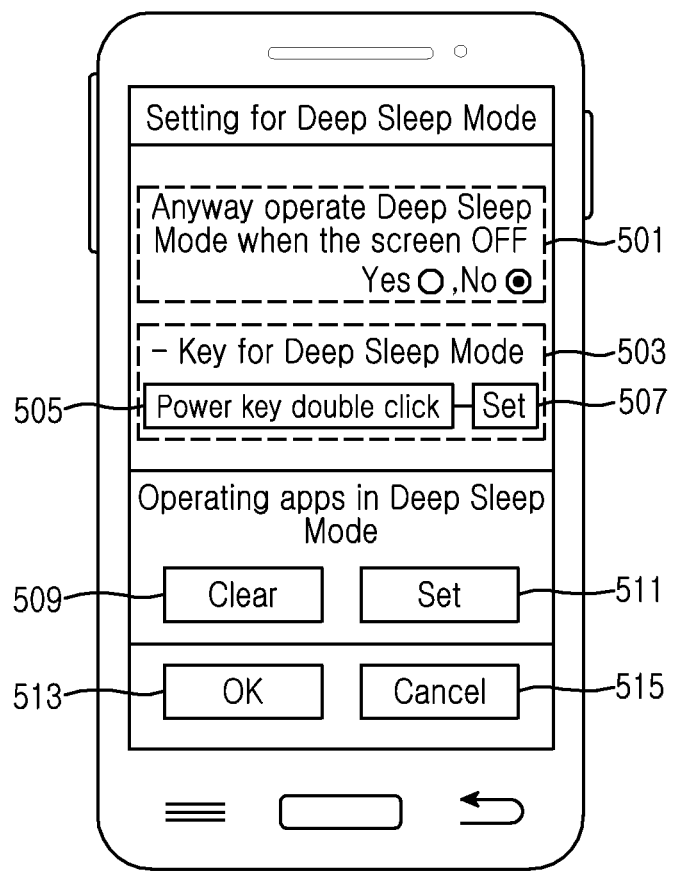
FIG. 5 illustrates an operation of setting a function executed corresponding to mode change in an electronic device according to various example embodiments.

FIG. 5 illustrates setting configuration for a function executed in response to a mode change in an electronic device according to various example embodiments.

Referring to FIG. 5, the electronic device 101 may provide one or more applications operable during deactivation of the display 150 of the electronic device 101, which may take the form of a setting menu for a function of the electronic device 101.

According to one example embodiment, the electronic device 101 may provide a menu 501 having options controlling one or more processors 120 of the electronic device 101 to operate certain processes in an inactive state when the display 150 is deactivated. According to one example embodiment, if 'Yes' within the 'Anyway operate Deep Sleep Mode when the screen OFF' menu 501 is selected, the electronic device 101 may cause one or more processors 120 of the electronic device 101 not be deactivated during deactivation of the display 150. When the display 150 is deactivated, the electronic device 101 may terminate any objects causing the one or more processors 120 to continue operating in an active state. Thus, designated objects among which cause the one or more processors 120 to operate in the active state are disabled even in the active state when the display 150 is deactivated. If an object activates one or more processors 120 of the electronic device 101 in a state not set as controlled during deactivation of the display 150, the electronic device 101 may acquire information about the object, and display the acquired information on the display 150 when activating the display 150 (e.g., in a method of FIG. 3B).

According to various example embodiments, if 'No' is selected within the 'operate Deep Sleep Mode when the screen is OFF' menu 501, then, when activating the display, the electronic device 101 does not terminate executing objects and maintains an active state of the one or more processors 120 when the display is deactivated.

According to one example embodiment, the electronic device 101 may enter into a waiting mode (e.g., deactivation of the display 150) through an input (e.g., one click or touch) received on one or more designated buttons (e.g., a power button) among various buttons physically disposed on the electronic device 101.

The electronic device 101 may receive an input on a menu icon 505 controlling the means of entry into deep sleep mode 503, which may include double-clicking a power button of the electronic device 101. According to an example embodiment, the electronic device 101 may enter a corresponding waiting mode when receiving an sing clicking or touching input on the power button, and may enter the corresponding maximum power saving mode when receiving a double clicking or twice touching input on the power button. The electronic device 101 may also provide a menu 507 to confirm changing the control input for entering the maximum power saving mode in the setting menu.

According to various example embodiments, the electronic device 101 may further display information about one or more objects operable when the display 150 is deactivated. According to one example embodiment, the electronic device 101 may provide the menu 501 to confirm and set information about one or more objects operable or having a history of operation during deactivation of the display in the setting menu. The electronic device 101 may provide a menu option 509, that, when selected clears the setting information (e.g., the list of the one or more objects having the history of operation during deactivation of the display 150).

According to various example embodiments, the electronic device 101 may store setting information in the memory 130 when the 'OK' menu item 513 is selected, and may close without storing the setting information when a 'Cancel' menu item 515 is selected.

Figure 6:
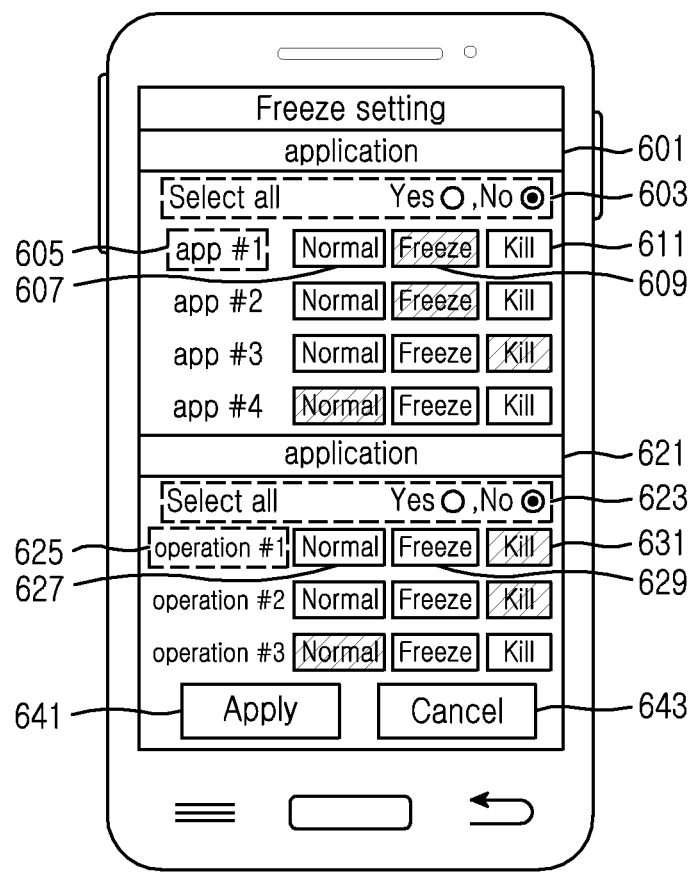
FIG. 6 illustrates an operation of setting a function executed corresponding to mode change in an electronic device according to various example embodiments.

FIG. 6 illustrates an operation of setting an executing function change execution modes in an electronic device according to various example embodiments.

Referring to FIG. 6, the electronic device 101 a setting menu may be displayed for confirming settings for one or more objects operable or having a history of operation during deactivation of a display.

According to one example embodiment, the electronic device 101 may provide a menu 601 including the one or more objects being operable or having the history of operation during the deactivation of the display. In displaying the information about the various objects, the electronic device 101 may provide one or more settable supplementary functions. According to one example embodiment, the electronic device 101 may display information 605 about an object 'app #1', and may provide one or more supplementary functions (e.g., 'Normal' 607, 'Freeze' 609, or 'Kill' 611).

The electronic device 101 may receive a selection of one or more of the provided supplementary functions, and may perform an operation corresponding to the selected supplementary function. According to one example embodiment describing the supplementary function, if 'Normal' 607 is selected, the "app #1" may continue operation without a limitation to functions when the display 150 is activated or deactivated. According to another example embodiment, if the 'Freeze' 609 option is selected, the electronic device 101 may freeze the 'app #1' application when the display is de-activated, preventing it from causing one or more processors of the electronic device 101 to remain in an active state at the time of deactivation of the display 150. According to a further example embodiment, when the 'Kill' 611 option is selected, the electronic device 101 may limit (e.g., terminate so not functions are executed) the functionality of the 'app #1' application at the time of activation or deactivation of the display 150.

The electronic device 101 may provide a menu option 603 allowing one-touch selection of all applications so that supplementary functions of various applications displayed on the display 150. The electronic device 101 may apply the aforementioned setting to all displayed applications, including for example the 'app #2' application, 'app #3' application, 'app #4' application, or various applications included in the memory 130 of the electronic device 101, without limiting the aforementioned setting to the 'app #1' application.

Without being limited to the aforementioned applications, the electronic device 101 may provide setting menus 621 to 629 of controlling other various objects operating in the electronic device 101, in the same or similar method to the aforementioned method.

According to various example embodiments, the electronic device 101 may store setting information in the memory 130 when the 'Apply' menu 641 option is selected, and may close without storing the setting information if selecting a 'Cancel' menu 643.

Figure 7A:
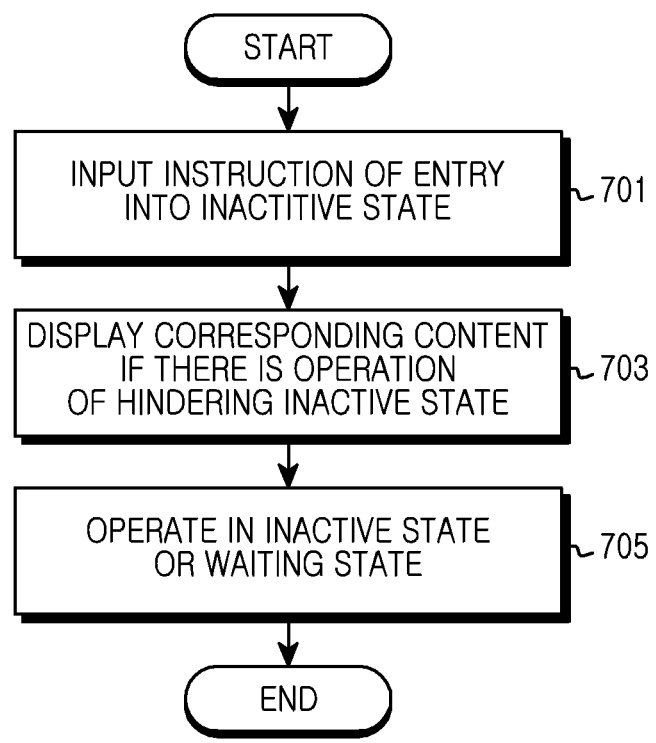
FIG. 7A and FIG. 7B are flowcharts illustrating procedures of providing an operation according to mode change in an electronic device according to various example embodiments.
Figure 7B:
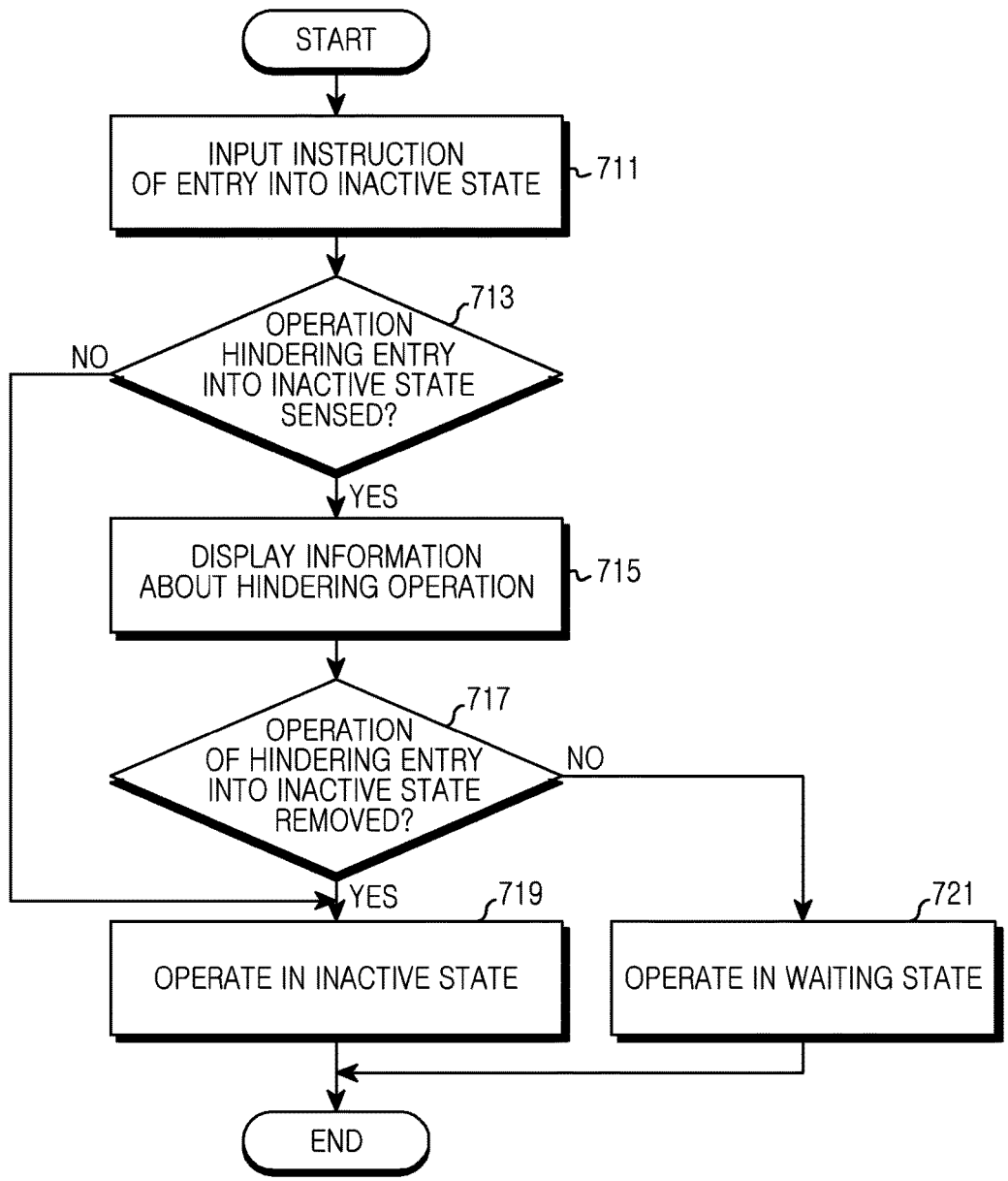

FIG. 7A and FIG. 7B are flowcharts illustrating procedures of providing an operation according to mode change in an electronic device according to various example embodiments.

If the display 150 of the electronic device 101 is in a turn-off state, the electronic device 101 may provide information about one or more objects operating in an active state one or more processor 120 of the electronic device 101.

Various example embodiments of the present disclosure are described below with reference to FIG. 7A.

In operation 701, the electronic device 101 may detect an input of an instructing the electronic device 101 to enter into an inactive state. The input or designated operation may be for example, detecting activation of a power button designated to control activation or deactivation of a power source of the electronic device 101 and the display 150 thereof. Next, the electronic device 101 may execute the inactive state corresponding to the designated operation (e.g., the input of the button).

In operation 703, when the designated operation is detected, the electronic device 101 may detected when an executing object hinders the electronic device 101 from entering or otherwise executing the inactive state (e.g., an object forcing the processor 120 of the electronic device 101 to remain in an active state), and may acquire corresponding information about the confirmed object. After that, the electronic device 101 may display the acquired information about the object to the display 150 of the electronic device 101.

In operation 705, the electronic device 101 may detect an input such as a selection on at least one of the displayed information, and may control or set a configuration of the electronic device 101 in accordance to the detected input. According to one example embodiment, the input may alter a configuration for one or more objects causing the electronic device 101 to remain in the active state, the altered configuration then allowing conversion into the inactive state. In accordance to the input, the electronic device 101 may terminate execution of a designated object or deactivate the display 150 of the electronic device 101. After performing the operation in response to the input (e.g., the operation of terminating the designated object), the electronic device 101 may enter the inactive mode when the electronic device 101 meets a condition indicating entry into the inactive state, and convert into a waiting state (e.g., deactivating the display 150) if the conditions indicate entry into the inactive state.

Various example embodiments of the present disclosure are described below with reference to FIG. 7B.

In operation 711, the electronic device 101 may sense an input of an instruction of controlling the electronic device 101 to convert into an inactive state. According to one example embodiment, the electronic device 101 may perform a designated operation to instruct the electronic device 101 to enter the inactive state. The designated operation an input to a button designated to control a function such as activation or deactivation of a power source of the electronic device 101 and the display 150 thereof. Next, the electronic device 101 may execute conversion into the inactive state in response to the designated operation (e.g., the input of the button).

In operation 713, the electronic device 101 may detect one or more objects that force maintenance of the active state of the electronic device 101 during conversion into the inactive state. According, the electronic device 101 may fail to execute the inactive state. If the operation inputted in operation 711 is deactivation of the display 150, the electronic device 101 may also deactivate the display 150 (e.g., a waiting state) when the electronic device 101 fails to convert into a power saving mode because of the one or more objects forcing maintenance of the active state of the electronic device 101. When detecting an object hindering conversion into the inactive state, the electronic device 101 may display information related to such in operation 715 and, if no objects hinder the conversion into the inactive state, the electronic device 101 may proceed operation 719.

In operation 715, the electronic device 101 may acquire information about one or more objects hindering conversion of the electronic device 101 into the inactive state. According to one example embodiment, the electronic device 101 may display the acquired information regarding the objects to the display 150 in, for example, a text list form, and may display the acquired information in, for example, an icon form. The electronic device 101 may terminate each of the outputted one or more objects, and may also terminate all designated objects hindering the operation of conversion into the inactive mode through a menu allowing selections indicating termination of objects, which may include, for example, applications and functions.

In operation 717, the electronic device 101 may detect whether the termination (as instructed by a user selection) has successfully terminated the object hindering conversion into the inactive state. According to one example embodiment, if the offending objects are successfully terminated, the electronic device 101 enter the inactive state as shown in operation 719 and, the offending objects are not successfully terminate, the electronic device 101 may proceed in a waiting state as shown in operation 721.

In operation 719, the electronic device 101 may convert and execute the inactive state. According to one example embodiment, if an object hindering the conversion into the inactive state does not exist, or if an executing object satisfies a condition indicating the electronic device 101 should enter the inactive state, the electronic device 101 may convert into and execute the inactive state.

In operation 721, the electronic device 101 may operate in a waiting mode. According to one example embodiment, the waiting mode described in operation 721 of FIG. 7B may be a state in which the electronic device 101 is performing one or more objects designated to be closed in order to operate the electronic device 101 in the inactive state. The electronic device 101 may also turn off the display 150 in a state (e.g., the active state of the electronic device 101) of failing to convert the electronic device 101 into the inactive state because of one or more objects operating the electronic device 101 in the active state.

In FIG. 7A and FIG. 7B, one example embodiment of the inactive state of the electronic device 101 may be a maximum power saving mode. In applying various example embodiments of FIG. 7A and FIG. 7B, without being limited to the maximum power saving mode, the electronic device 101 may be applied to example embodiments of a sleep mode, a power saving mode and other such concepts that involve a mode wherein one or more processors 120 of the electronic device 101 may be deactivated or partially activated.

Figure 8:
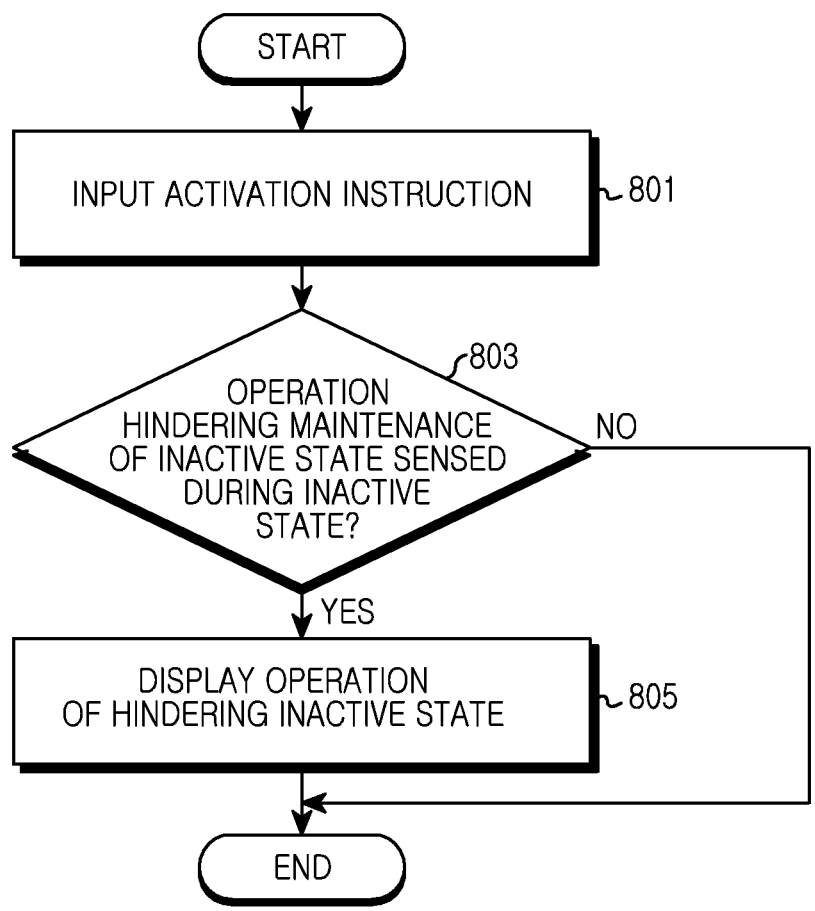
FIG. 8 is a flowchart illustrating a procedure of providing an operation according to mode change in an electronic device according to various example embodiments.

FIG. 8 is a flowchart illustrating a procedure of executing an operation according to mode change in an electronic device according to various example embodiments.

Referring to FIG. 8, the electronic device 101 may output information about one or more objects having operated during deactivation of the display 150.

In operation 801, the electronic device 101 may detect an input activating the electronic device 101. According to one example embodiment, the detected activation instruction inputted to the electronic device 101 may indicate activation of the display 150, which was previously in a deactivated state.

In operation 803, the electronic device 101 may detect whether one or more objects caused the one or more processors 120 of the electronic device 101 to remain in an active state when the display 150 was deactivated. If such an object is detected, the electronic device 101 may acquire information about the detected one or more objects, and display the acquired information in operation 805 and, if no such object is detected, the electronic device 101 may end the example embodiment of FIG. 8.

In operation 805, the electronic device 101 may display to the activated display 150 the acquired information about the causing the one or more processors 120 of the electronic device 101 to remain in the active state when the display 150 is deactivated.

If performing operation 805, the electronic device 101 may end the example embodiment of FIG. 8.

Various example embodiments describe the outputting operation as displaying on the display 150, but this is a representative example embodiment displaying on the display 150 and it is obvious that the outputting operation may be represented by various other methods such as outputting by sound through a speaker module, vibration through a vibration module (e.g., a motor), and light emitting through one or more light emitting modules (e.g., LEDs).

According to various example embodiments, an operation method of the electronic device 101 can include the steps of sensing a display turn-off instruction or an electronic device 101 inactive mode entry instruction, deciding whether one or more objects maintaining an active state of the electronic device 101 exist and, if the one or more objects exist, outputting the existence of the one or more objects.

According to various example embodiments, the electronic device 101 can output information about one or more objects controlling a use of one or more processors 120 at a time point of sensing a display turn-off input and operating in a power saving mode or maximum power saving mode.

According to various example embodiments, the electronic device 101 can sense an operation of an object forcing an active state of the processor 120.

According to various example embodiments, the electronic device 101 can output to the display 150 the information about the objects forcing the active state of the processor 120. According to various example embodiments, the electronic device 101 can output to the display 150 the information about the objects forcing the active state of the processor 120 during a designated period of time (e.g., 1 second or 10 seconds) at a time point of turning off the display 150, and turn off the display 150. In displaying the information about the object forcing the active state of the processor 120, the various example embodiments can display the information about the object by an icon corresponding to the object or a name of the object, and close, stop or pause a corresponding object in accordance to a user's control. According to various example embodiments, the electronic device 101 can output information about an operation of closing, stopping or pausing the object performed in accordance to the user's control.

According to various example embodiments, the electronic device 101 can sense an operation of an API in the object forcing the active state of the processor 120. The electronic device 101 can control the corresponding API in a separate list.

According to various example embodiments, the electronic device 101 can display, by color, information about an active state or inactive state of the electronic device 101 through one or more light-emitting modules.

According to various example embodiments, if one or more processors 120 are in an active state during turn-off of the display 150, the electronic device 101 can output information about an active state of the electronic device 101 in accordance to a period of time (e.g., 10 minutes, 20 minutes, 30 minutes, or 1 hour).

According to various example embodiments, the electronic device 101 can record information of a time of execution of one or more objects operating one or more processors 120 in an active state in a turn-off state of the display 150, an operation time after the execution of the object, and the like.

Figure 9A:
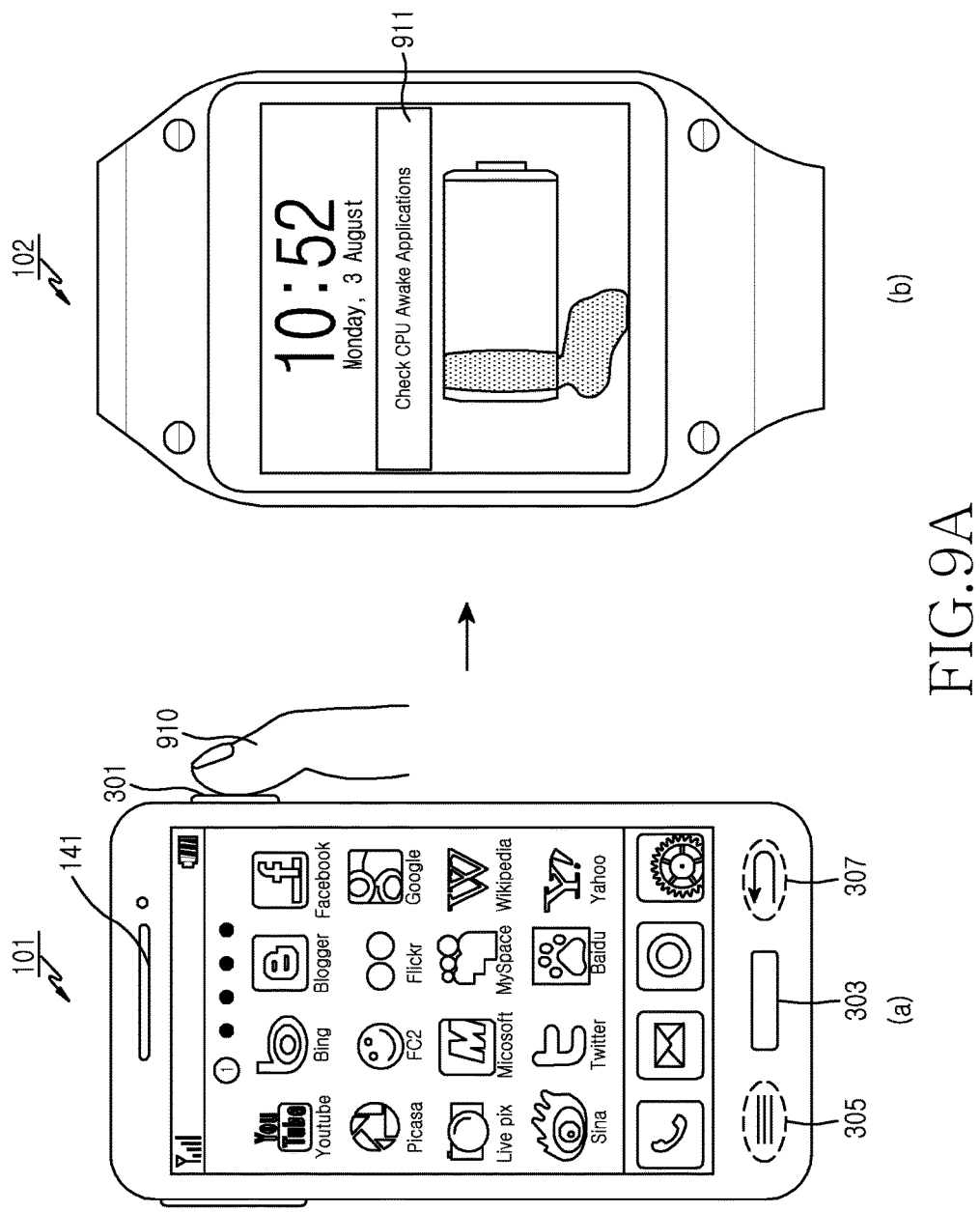
FIG. 9A and FIG. 9B illustrate an operation of providing information to another electronic device in accordance to mode change in an electronic device according to various example embodiments.
Figure 9B:
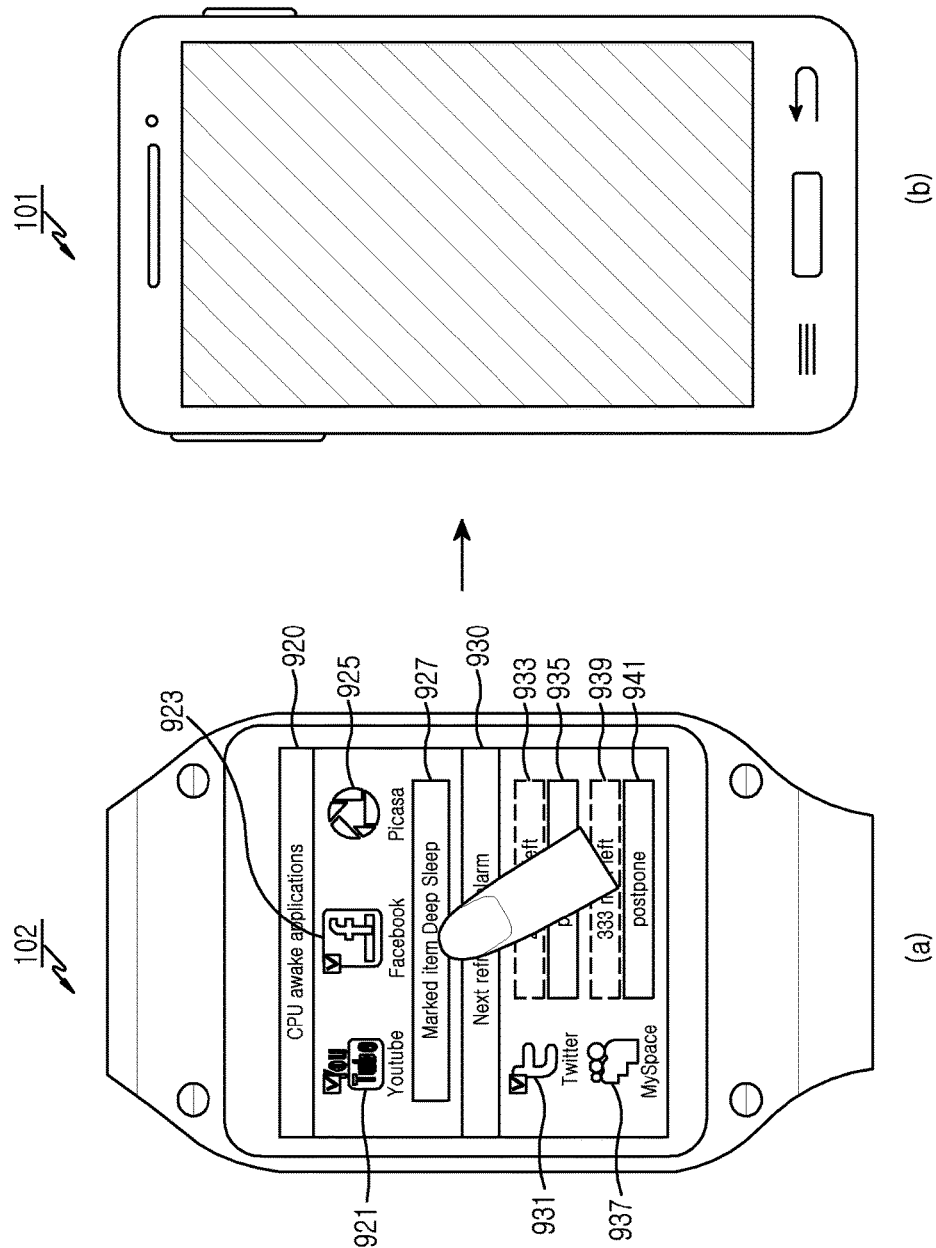

FIG. 9A and FIG. 9B illustrate an operation of providing information to another electronic device in accordance to mode change in an electronic device according to various example embodiments.

When the electronic device 101 (e.g., a $1^{st}$ electronic device 101) is coupled with one or more other electronic devices (e.g., a $2^{nd}$ electronic device 102 or a $3^{rd}$ electronic device 104) through a designated network communication, the electronic device 101 may detect an instruction deactivating the display 150 of the electronic device 101 or executes an inactive state. If an executing object or data process keeps the processor 120 in an active state or hinders the processor 120 from entering the inactive state, the electronic device 101 may display the object or data on the display 150 of the electronic device 101 in accordance to the aforementioned method, or may display the object or data to one or more other electronic devices (e.g., the 2nd electronic device 102 and/or the $3^{rd}$ electronic device) coupled with the electronic device 101.

Various example embodiments of the present disclosure are described below with reference to FIG. 9A.

Referring to FIG. 9A (a), the electronic device 101 may deactivate the display 150 by receiving a selection (910) indicating deactivation of the display 150, such as a depression of a designated button 301 of the electronic device 101. When the display 150 is deactivated, the electronic device 101 may execute the inactive state. While converting the processor 120 into the inactive state, the electronic device 101 may terminate one or more programs or functions. According to one example embodiment, one or more objects that are operating in the electronic device 101 may be thus be set to be terminated when a designated instruction is ended, but may not be successfully terminated by the time the processor 120 is attempting conversion into the inactive state.

This information indicating that the one or more objects are hindering the inactive state may be transmitted to the designated $2^{nd}$ electronic device 102 coupled with the electronic device 101 through a network communication. The electronic device 101 may instruct the display of information indicating that the electronic device 101 remains in an active state on the display 150 of the $2^{nd}$ electronic device 102 as in FIG. 9A (b). The $2^{nd}$ electronic device 102 may display that the $1^{st}$ electronic device 101 is in the active state, such as a 'Check CPU Awake Application' 911, in response to the received information.

Various example embodiments of the present disclosure are described below with reference to FIG. 9B.

Referring to FIG. 9B (a), when the electronic device 101 instructs the $2^{nd}$ electronic device 102 to display information about one or more objects of the electronic device 101 interfering with the inactive state, the electronic device 101 may transmit information for generation and display of a menu of allowing forced closure of the interfering one or more objects of the $1^{st}$ electronic device 101. Also, the electronic device 101 may transmit information for generation and execution of an alarm set to alert a user at a time point of the lapse of a designated time as set on the electronic device 101, and information for generation and execution of a menu or menu item allowing postponing generation of user notification operations. The $2^{nd}$ electronic device 102 may thus display information about an object executing within the $1^{st}$ electronic device 101 and information about an alarm to be generated. This information may be displayed on the display 150 with reference to information received from the $1^{st}$ electronic device 101.

According to one example embodiment, if the $2^{nd}$ electronic device 102 receives a selection of menu item 911 indicating that the electronic device 101 is in the active state as in FIG. 9A (b), the $2^{nd}$ electronic device 102 may display a menu allowing control of at least one application or function that is executing in the $1^{st}$ electronic device 101, and/or information about an alarm to be triggered at a designated time.

Referring to FIG. 9B (a), according to one example embodiment, based on the information received from the $1^{st}$ electronic device 101, the $2^{nd}$ electronic device 102 may display a menu icon 920 for objects executing in the $1^{st}$ electronic device 101 such as the 'YouTube' application 921, the 'Facebook' application 923, and a 'Picasa' application 923, all of which may be shown on the display of the $2^{nd}$ electronic device 102. The $2^{nd}$ electronic device 102 may display an information menu 930 including alarms to be triggered at a designated time, such as an alarm indicator 931 for a 'Twitter' application, alarm indicator 937 for a 'MySpace' application, along with information displays 933 and 939 showing time remaining before triggering of the respective alarm, and selectable icons 935 and 941 which allow postponing triggering of the alarms. The $2^{nd}$ electronic device 102 may transmit an instruction to the $1^{st}$ electronic device 101 causing forced termination of one or more applications, objects, data processes, etc. that are not terminated and are continually executing in the $1^{st}$ electronic device 101.

According to one example embodiment, if the $2^{nd}$ electronic device 102 receives a selection of the 'Facebook' application 923 displayed in the $2^{nd}$ electronic device 102, and subsequently receives a selection of a menu icon 'Marked item Deep Sleep' 927 (which forcedly closes the selected object), the $2^{nd}$ electronic device 102 may transmit information to the $1^{st}$ electronic device 101 instructing forced termination of the 'Facebook' application that is executing in the 1st electronic device 101. The 2nd electronic device 102 may further allow selection, forced termination or postponement (e.g., via selection of icons 935 or 941) of one or more alarms to be triggered within a designated time, and may transmit any such related information in accordance with the selections to the 1st electronic device 101.

Referring to FIG. 9B (b), based on the information received from the 2nd electronic device 102, the 1st electronic device 101 may terminate an application, process or object that is executing in the 1st electronic device 101 and/or postpone a triggering of an alarm that was to be generated within a designated time.

Figure 10:
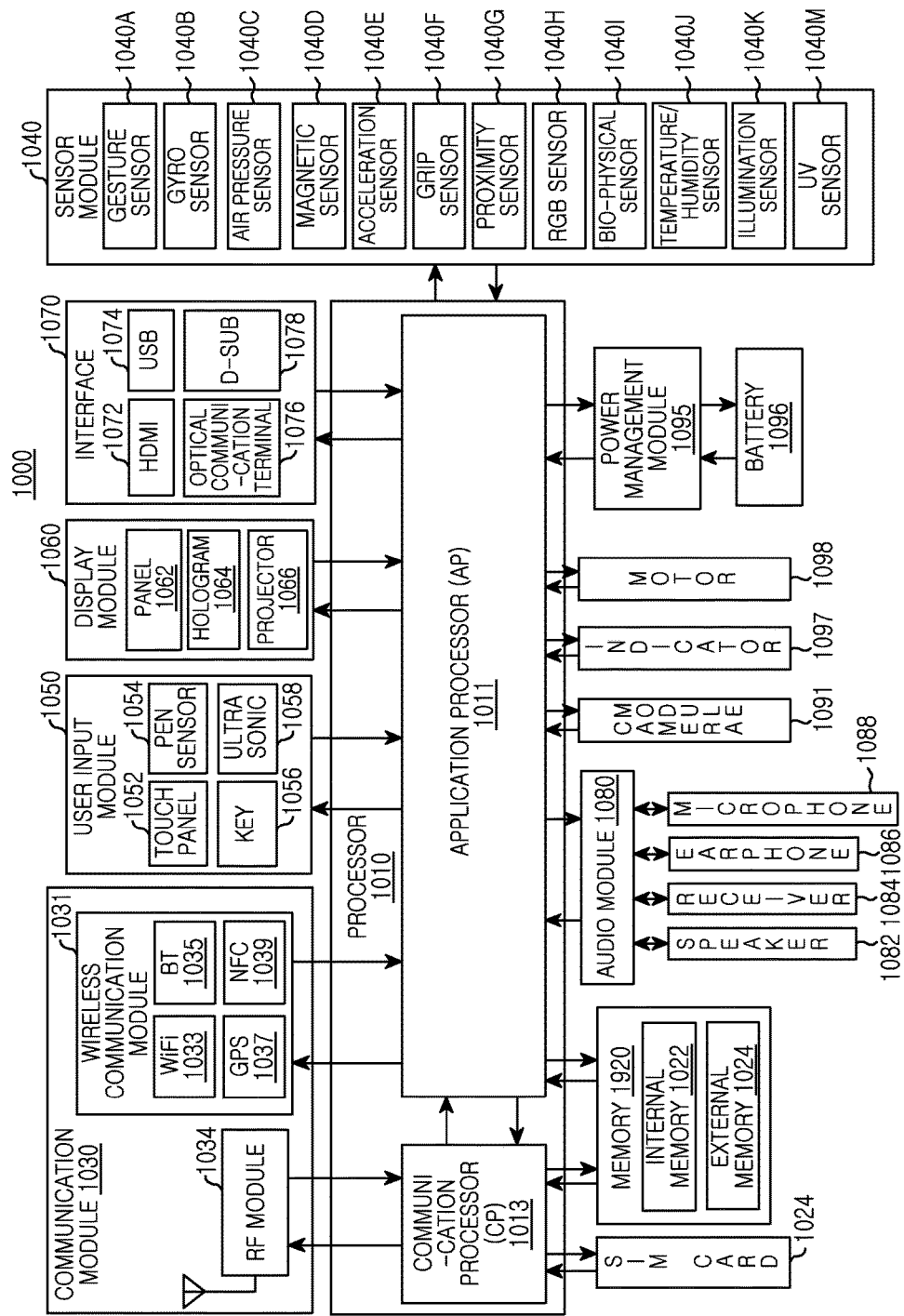
FIG. 10 is a block diagram illustrating a construction of an electronic device according to various example embodiments.

FIG. 10 is a block diagram illustrating a construction of an electronic device according to various example embodiments.

The electronic device 1000 may, for example, construct the whole or part of the electronic device 101 illustrated in FIG. 1. Referring to FIG. 10, the electronic device 1000 may include one or more processors 1010, a Subscriber Identification Module (SIM) card 1014, a memory 1020, a communication module 1030, a sensor module 1040, a user input module 1050, a display module 1060, an interface 1070, an audio module 1080, a camera module 1091, a power management module 1095, a battery 1096, an indicator 1097, or a motor 1098.

The processor 1010 (e.g., the processor 120) may include one or more Application Processors (AP) 1011 or one or more Communication Processors (CP) 1013. For example, FIG. 10 illustrates that the AP 1011 and the CP 1013 may be included within the processor 1010, but the AP 1011 and the CP 1013 may be included within different Integrated Circuit (IC) packages, respectively. According to one example embodiment, the AP 1011 and the CP 1013 may be included within one IC package.

The AP 1011 may drive an operating system or an application program and control a plurality of hardware or software constituent elements coupled to the AP 1011, and perform processing and operation of various data including multimedia data. The AP 1011 may be, for example, implemented as a System On Chip (SoC). According to one example embodiment, the processor 1010 may further include a Graphic Processing Unit (GPU) (not shown).

The CP 1013 may perform a function of managing a data link and converting a communication protocol, in communication between other electronic devices (e.g., an electronic device 102, an electronic device 104, or a server 106) coupled with the electronic device 1000 (e.g., the electronic device 101) through a network. The CP 1013 may be, for example, implemented a SoC. According to one example embodiment, the CP 1013 may perform at least a part of a multimedia control function. The CP 1013 may, for example, perform electronic device distinction and authorization within a communication network using a subscriber identification module (e.g., the SIM card 1014). Also, the CP 1013 may provide services such as voice call, video call, text message, packet data or the like to a user.

Also, the CP 1013 may control data transmission/reception of the communication module 1030. FIG. 10 illustrates the constituent elements such as the CP 1013, the power management module 1095, the memory 1020 or the like, as constituent elements separate from the AP 1011 but, according to one example embodiment, the AP 1011 may be implemented to include at least some (e.g., the CP 1013) of the aforementioned constituent elements.

According to one example embodiment, the AP 1011 or the CP 1013 may load to a volatile memory an instruction or data received from a non-volatile memory coupled to each of the AP 1011 and the CP 1013 or at least one of other constituent elements, and process the loaded instruction or data. Also, the AP 1011 or the CP 1013 may store in the non-volatile memory data received from at least one of other constituent elements or generated by at least one of the other constituent elements.

The SIM card 1014 may be a card including a subscriber identification module, and may be inserted into a slot provided in a specific position of the electronic device 1000. The SIM card 1014 may include unique identification information (e.g., an Integrated Circuit Card ID (ICCID)) or subscriber information (e.g., an International Mobile Subscriber Identity (IMSI)).

The memory 1020 (e.g., the memory 130) may include an internal memory 1022 or an external memory 1024. The internal memory 1022 may, for example, include at least one of a volatile memory (for example, a Dynamic Random Access Memory (DRAM), a Static RAM (SRAM), a Synchronous Dynamic RAM (SDRAM) and the like) or a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory and the like). According to one example embodiment, the internal memory 1022 may be a Solid State Drive (SSD). The external memory 1024 may further include a flash drive, for example, Compact Flash (CF), Secure Digital (SD), micro-SD, Mini-SD, extreme Digital (xD), a memory stick, or the like. The external memory 1024 may be operatively coupled with the electronic device 1000 through various interfaces. According to one example embodiment, the electronic device 1000 may further include a storage device (or a storage media) such as a hard drive.

The communication module 1030 (e.g., the communication interface 160) may include a wireless communication module 1031 and a Radio Frequency (RF) module 1034. The wireless communication module 1031 may, for example, include a WiFi 1033, a BT 1035, a GPS 1037, or an NFC 1039. For example, the wireless communication module 1031 may provide a wireless communication function using a radio frequency. Additionally or alternatively, the wireless communication module 1031 may include a network interface (e.g., a LAN card), a modem, or the like for coupling the electronic device 1000 with a network (e.g., the Internet, a LAN, a WAN, a telecommunication network, a cellular network, a satellite network, a POTS or the like).

The RF module 1034 may take charge of transmission/reception of data, for example, transmission/reception of an RF signal. Though not illustrated, the RF module 1034 may, for example, include a transceiver, a Power Amplifier Module (PAM), a frequency filter, a Low Noise Amplifier (LNA) or the like. Also, the RF module 1034 may further include a component for transmitting/receiving an electromagnetic wave on a free space in wireless communication, for example, a conductor, a conductive line or the like.

The sensor module 1040 may meter a physical quantity or sense an activation state of the electronic device 1000, and convert metered or sensed information into an electrical signal. The sensor module 1040 may, for example, include at least one of a gesture sensor 1040A, a gyro sensor 1040B, an air pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a bio-physical sensor 1040I, a temperature/humidity sensor 1040J, an illumination sensor 1040K, or a Ultraviolet (UV) sensor 1040M. Additionally or alternatively, the sensor module 1040 may, for example, further include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), a fingerprint sensor (not shown) or the like. The sensor module 1040 may further include a control circuit for controlling at least one or more sensors belonging to therein.

The input module 1050 may include a touch panel 1052, a (digital) pen sensor 1054, a key 1056, or an ultrasonic input device 1058. The touch panel 1052 may, for example, recognize a touch input in at least one of a capacitive overlay method, a pressure sensitive method, an infrared beam method, or an acoustic wave method. Also, the touch panel 1052 may also further include a control circuit. In a case of the capacitive overlay method, physical contact or proximity recognition is possible. The touch panel 1052 may also further include a tactile layer. In this case, the touch panel 1052 may provide a tactile response to a user.

The (digital) pen sensor 1054 may be implemented in the same or similar method to receiving a user's touch input or using a separate sheet for recognition. The key 1056 may, for example, include a physical button, an optical key, a keypad, or a touch key. The ultrasonic input device 1058 is a device capable of identifying data by sensing a sound wave by a microphone (e.g., the microphone 1088) in the electronic device 1000 through an input tool generating an ultrasonic signal, and enables wireless recognition. According to one example embodiment, the electronic device 1000 may also receive a user input from an external device (e.g., a network, a computer or a server) coupled with the electronic device 1000 through the communication module 1030.

The display module 1060 (e.g., the display 150) may include a panel 1062, a hologram 1064, or a projector 1066. The panel 1062 may, for example, be a Liquid Crystal Display (LCD), an Active-Matrix Organic Light-Emitting Diode (AMOLED) or the like. The panel 1062 may be implemented to be flexible, transparent, or wearable. The panel 1062 may be also constructed as one module with the touch panel 1052. The hologram 1064 may show a three-dimensional image in the air using interference of light. The projector 1066 may project light to a screen and display an image. The screen may be, for example, located inside or outside the electronic device 1000. According to one example embodiment, the display module 1060 may further include a control circuit for controlling the panel 1062, the hologram 1064, or the projector 1066.

The interface 1070 may, for example, include a High Definition Multimedia Interface (HDMI) 1072, a Universal Serial Bus (USB) 1074, an optical communication terminal 1076, and a D-subminiature (D-sub) 1078. The interface 1070 may be, for example, included in the communication interface 160 illustrated in FIG. 1. Additionally or alternatively, the interface 1070 may, for example, include a Mobile High-Definition Link (MHL) (not shown), Secure Digital/Multi Media Card (SD/MMC) (not shown) or Infrared Data Association (IrDA) (not shown).

The audio module 1080 may convert a voice and an electric signal interactively. At least some constituent elements of the audio module 1080 may be, for example, included in the input/output interface 140 illustrated in FIG. 1. The audio module 1080 may, for example, process sound information inputted or outputted through a speaker 1082, a receiver 1084, an earphone 1086, or the microphone 1088.

The camera module 1091 is a device able to take a picture and a video. According to one example embodiment, the camera module 1091 may include one or more image sensors (e.g., a front lens or rear lens), a lens (not shown), an Image Signal Processor (ISP) (not shown), or a flash (not shown) (e.g., an LED or a xenon lamp).

The power management module 1095 may manage electric power of the electronic device 1000. Though not illustrated, the power management module 1095 may, for example, include a Power Management Integrated Circuit (PMIC), a charger IC, or a battery or fuel gauge.

The PMIC may be, for example, mounted within an integrated circuit or a SoC semiconductor. A charging method may be divided into a wired charging method and a wireless charging method. The charger IC may charge a battery 1096, and may prevent the introduction of overvoltage or overcurrent from an electric charger. According to one example embodiment, the charger IC may include a charger IC for at least one of the wired charging method or the wireless charging method. The wireless charging method may, for example, be a magnetic resonance method, a magnetic induction method, an electromagnetic wave method, or the like. A supplementary circuit for wireless charging, for example, a circuit such as a coil loop, a resonance circuit, a rectifier or the like may be added.

The battery gauge may, for example, measure a level of the battery 1096, an electric voltage in charging, an electric current, or a temperature. The battery 1096 may generate or store electricity, and supply a power source to the electronic device 1000 using the stored or generated electricity. The battery 1096 may, for example, include a rechargeable battery or a solar cell.

The indicator 1097 may display a specific status of the electronic device 1000 or a part (e.g., the AP 1011) thereof, for example a booting state, a message state, a charging state or the like. The motor 1098 may convert an electrical signal into a mechanical vibration. Though not illustrated, the electronic device 1000 may include a processing device (e.g., a GPU) for mobile TV support. The processing device for mobile TV support may, for example, process media data according to the standards of Digital Multimedia Broadcasting (DMB), Digital Video Broadcasting (DVB), a media flow or the like.

Various example embodiments of the present disclosure may provide a method for acquiring information about an object operating in an electronic device in accordance to a designated method and outputting the acquired information, thereby being able to control the object in accordance to a user's intention, and controlling a non-used object, thereby being able to reduce the battery consumption of the electronic device, and the electronic device thereof.

According to various example embodiments, an electronic device comprising: a display configured to output an operation being in execution; a memory configured to store information about the operation; and one or more processors configured to sense a display turn-off instruction or an electronic device inactive mode entry instruction, deciding whether one or more objects maintaining an active state of the electronic device exist and, if the objects exist, outputting the existence of the objects. According to various example embodiments, wherein the processor outputs a list arranging icons of the objects or arraying names of the objects on a display. According to various example embodiments, wherein the processor decides to enter an inactive mode if an electric current capacity, electric energy, or consumed electric energy per unit hour consumed by a processor of the electronic device is less than a designated numerical value. According to various example embodiments, wherein the processor closes designated at least some objects among the displayed objects. According to various example embodiments, wherein the processor closes all of the displayed objects and enters an inactive mode of the electronic device. According to various example embodiments, wherein the processor stores as a list at least some of objects operating a processor of the electronic device during turn-off of a display. According to various example embodiments, wherein the processor outputs the stored list in accordance to a designated period of time. According to various example embodiments, wherein the processor sets to, upon sensing the display turn-off instruction or the electronic device inactive mode entry instruction, close at least one of the objects maintaining a use of a processor of the electronic device. According to various example embodiments, wherein the processor provides data requesting one or more other electronic devices coupled with the electronic device by a network communication to output the existence of the objects, to the other electronic devices. According to various example embodiments, wherein the processor closes designated one or more of the objects based on control information received from one or more other electronic devices coupled by a network communication.

According to various example embodiments, an electronic device comprising: a display configured to output an operation being in execution; a memory configured to store information about the operation; and one or more processors configured to turn off a display, acquiring one or more objects maintaining an active state of the electronic device, turning on the display, and outputting the acquired object. According to various example embodiments, wherein the processor outputs one or more of a time of execution of the object and an operation time after the execution of the object, together with the object.

The aforementioned constituent elements of the electronic device according to various example embodiments of the present disclosure may be each implemented with one or more components, and the names of the corresponding constituent elements may be different in accordance to the kind of the electronic device. The electronic device according to various example embodiments of the present disclosure may include at least one of the aforementioned constituent elements, omit some constituent elements or further include additional other constituent elements. Also, some of the constituent elements of the electronic device according to various example embodiments of the present disclosure are combined and constructed as one entity, thereby being able to identically perform functions of the corresponding constituent elements before combination.

The term "module" used in the present disclosure may, for example, represent a unit including one of hardware, software, and firmware or a combination of two or more. The "module" may be, for example, used interchangeably with the terms "unit", "logic", "logical block", "component", "circuit" or the like. The "module" may be also the minimum unit of an integrally constructed component or a part thereof. The "module" may be also the minimum unit performing one or more functions or a part thereof. The "module" may be implemented mechanically or electronically. For example, the "module" according to the present disclosure may include at least one of an Application-Specific Integrated Circuit (ASIC) chip, Field-Programmable Gate Arrays (FPGAs) or an application-possible logic device performing some operations, well known to the art or to be developed in the future.

According to various example embodiments, at least part of an apparatus (e.g., modules or functions thereof) or method (e.g., operations) according to the present disclosure may be, for example, implemented by an instruction stored in a computer-readable storage media in a form of a programming module. In a case where the instruction is executed by one or more processors (e.g., the processor 120), the one or more processors may perform functions corresponding to the instructions. The computer-readable storage media may be, for example, the memory 130. At least part of the programming module may be, for example, implemented (e.g., executed) by the processor 120. At least part of the programming module may include, for example, a module, an application, a routine, a set of instructions, a process and/or the like for performing one or more functions.

The programming module according to the present disclosure may include at least one or more of the aforementioned constituent elements, or omit some of the aforementioned constituent elements, or include additional other constituent elements. Operations carried out by the programming module according to the present disclosure or other constituent elements may be executed in a sequential, parallel, repeated or heuristic method. Also, some operations may be executed in a different sequence or may be omitted, or other operations may be added.

The computer-readable recording media may include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device specially configured to store and perform an application instruction (e.g., the programming module) such as a Read Only Memory (ROM), a Random Access Memory (RAM), a flash memory and the like. Also, the application instruction may include a mechanical code such as a code made by a compiler and also a high-level language code executable by a computer using an interpreter and the like. The aforementioned hardware device may be configured to operate as one or more software modules in order to perform an operation of the present disclosure, and vice versa.

And, example embodiments of the present disclosure invented in the present specification and drawings merely suggest specific examples so as to easily describe the technological content of the present disclosure and help the understanding of the present disclosure, and do not intend to limit the ambit of the present disclosure. Accordingly, it should be understood that the scope of the present disclosure includes not merely the example embodiments invented herein but also all modified or deformed forms drawn based on the technological merits of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA.

As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "micro processor" constitute hardware in the claimed disclosure. Under the broadest reasonable interpretation, the appended claims constitute statutory subject matter in compliance with 35 U.S.C. §101.

What is claimed is:

1. An operation method of an electronic device and another electronic device, comprising:
   detecting, by a processor of the electronic device, a first input to the electronic device by a user indicating deactivation of a display of the electronic device or entrance into an inactive mode of the electronic device;
   detecting whether one or more objects executing on the processor force the processor to remain in an active mode;
   if the one or more objects are detected, retrieving information on the one or more objects;
   deactivating the display of the electronic device or entering the electronic device into the inactive mode;
   after deactivating the display or entering into the inactive mode, if the one or more objects are detected, displaying, on said another electronic device, a notification for the same user that the one or more objects are detected; and
   in response to a second input by the same user to said another electronic device, displaying the retrieved information in a menu on said another electronic device, the menu adapted to allow the same user to terminate at least one of the one or more objects executing on the processor of the electronic device.

2. The method of claim 1, wherein displaying the retrieved information further comprises displaying a list, which includes at least one of: icons representing the one or more objects, and sorted names of the one or more objects.

3. The method of claim 2, further comprising storing the list of the one or more objects forcing the processor to operate.

4. The method of claim 3, further comprising displaying the list for a predetermined amount of time before terminating the one or more objects.

5. The method of claim 1, wherein the inactive mode comprises operating the processor such that consumption of electric energy is equal to or less than a predefined value.

6. The method of claim 1, further comprising terminating all of the one or more objects.

7. The method of claim 1, further comprising:
   reactivating the display; and
   displaying the retrieved information on the display.

8. The method of claim 7, wherein displaying the retrieved information further comprises displaying a name of each of the one or more objects, an icon of each of the one or more objects, a time of execution of each of the one or more objects, or an operation time each of the one or more objects.

9. An electronic device comprising:
   a display; and
   one or more processors configured to:
      detect a first input to the electronic device by a user indicating deactivation of a display of the electronic device or entrance into an inactive mode of the electronic device,
      detect whether one or more objects executing one the one or more processors force the one or more processors to remain in an active mode,
      when the one or more objects are detected, retrieve information on the one or more objects;
      deactivate the display of the electronic device or enter the electronic device into the inactive mode;
      after deactivating the display or entering into the inactive mode, if the one or more objects are detected, transmit a first data to another electronic device to allow said another electronic device to display a notification for the same user that the one or more objects are detected; and
      in response to a second input by the same user to said another electronic device, transmit a second data to said another electronic device to allow said another electronic device to display the retrieved information in a menu, the menu adapted to allow the same user to terminate at least one of the one or more objects executing on the one or more processors.

10. The electronic device of claim 9, wherein displaying the retrieved information further comprises displaying a list of the one or more objects including at least one of:
   icons representing the one or more objects; and
   names representing the one or more objects.

11. The electronic device of claim 10, wherein the one or more processors store the list of the one or more objects forcing the processor to operate.

12. The electronic device of claim 11, wherein the one or more processors display the list for a predetermined amount of time before terminating the one or more objects.

13. The electronic device of claim 9, wherein the inactive mode comprises operating the one or more processors such that consumption of electric energy is equal to or less than a predefined value.

14. The electronic device of claim 9, wherein the one or more processors terminate all of the one or more objects.

* * * * *